United States Patent [19]

Kirchhofer et al.

[11] Patent Number: 4,804,264
[45] Date of Patent: Feb. 14, 1989

[54] ARRANGEMENT FOR TIME-RESOLVED OPTICAL BACKSCATTER MEASUREMENT AT OPTICAL WAVEGUIDES

[75] Inventors: Rolf Kirchhofer, Mellingen; Hanspeter Schad, Rieden, both of Switzerland

[73] Assignee: BBC Brown Boveri AG, Baden, Switzerland

[21] Appl. No.: 75,821

[22] Filed: Jul. 20, 1987

[30] Foreign Application Priority Data

Aug. 11, 1986 [DE] Fed. Rep. of Germany ....... 3627198

[51] Int. Cl.$^4$ .......................... G01J 5/08; G01N 21/65
[52] U.S. Cl. ......................................... 356/44; 374/31; 374/161; 356/301; 350/401
[58] Field of Search .................. 350/401, 404; 356/43, 356/44, 45, 301; 374/130, 131, 161, 162

[56] References Cited

U.S. PATENT DOCUMENTS 3,414,354 12/1968 Siegler, Jr. ........................ 356/301
4,564,931 1/1986 O'Hara et al. ..................... 350/401

FOREIGN PATENT DOCUMENTS 2140554 11/1984 United Kingdom ................ 374/131
2170594 8/1986 United Kingdom ................ 356/43
2181830 4/1987 United Kingdom ................ 356/45

OTHER PUBLICATIONS

Dakin et al, *SPIE vol. 566 Fiber Optic and Laser Sensors III*, (1985) pp. 249–256.

Primary Examiner—F. L. Evans
Attorney, Agent, or Firm—Oblon, Fisher, Spivak, McClelland & Maier

[57] ABSTRACT

A measuring apparatus for space-resolved temperature measurement by optical backscattering measurement at optical waveguides, wherein an improvement in the signal-to-noise ratio is achieved by including an additional filter device to attenuate the Rayleigh peak in the backscattered light. The filter device preferably includes a polarizing beam splitter, behind which a quarter-wave plate and an interference filter are disposed in the transmission direction.

7 Claims, 3 Drawing Sheets

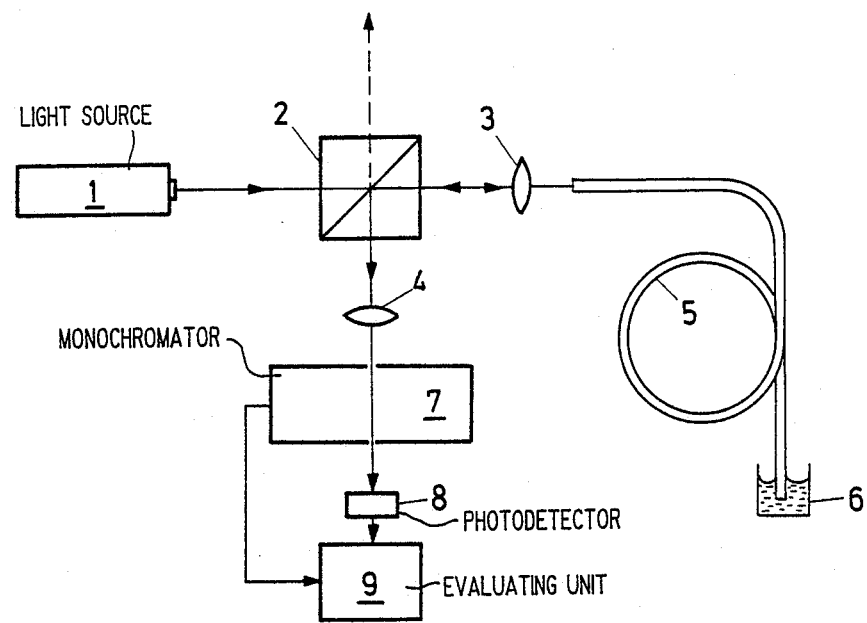
FIG.1 PRIOR ART
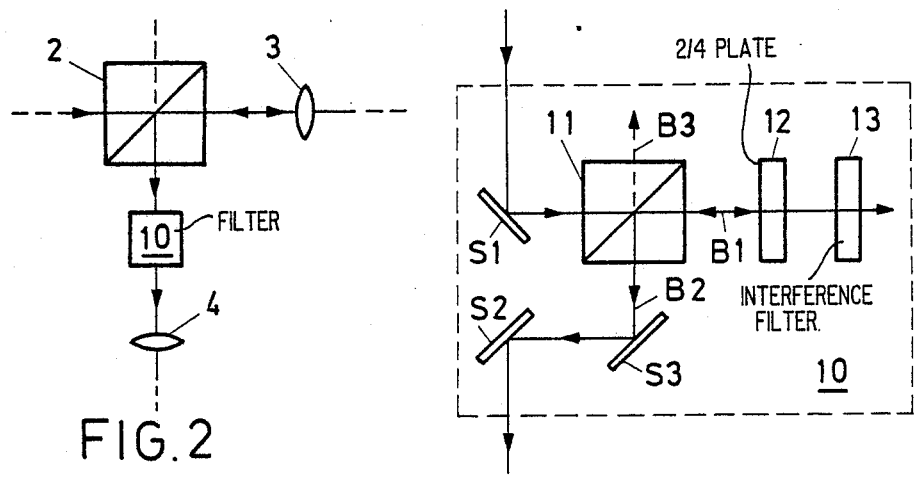
FIG.2
FIG.3

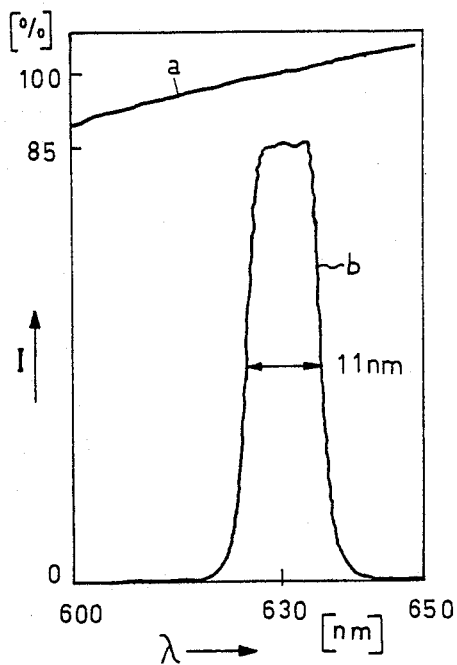
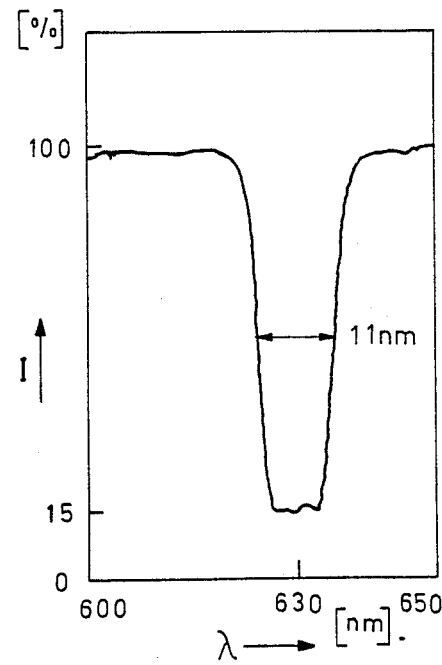
FIG.4A  FIG.4B
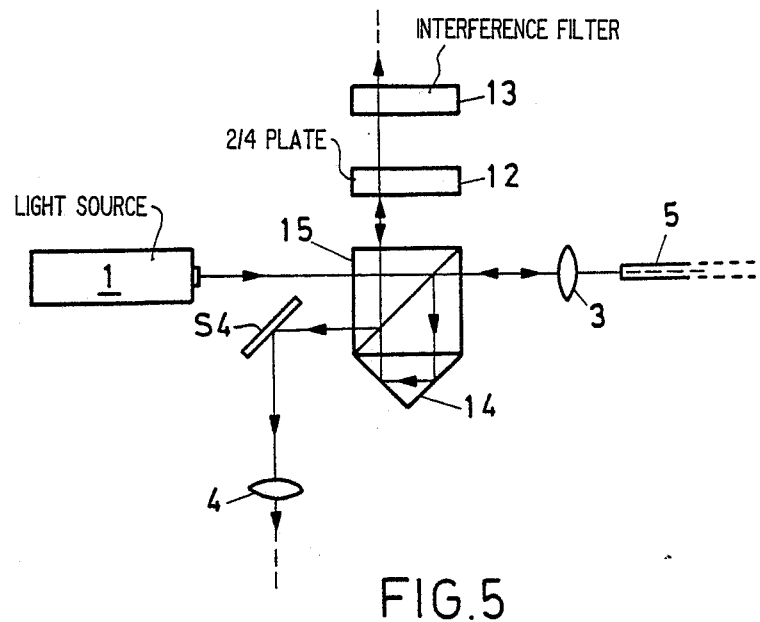
FIG.5

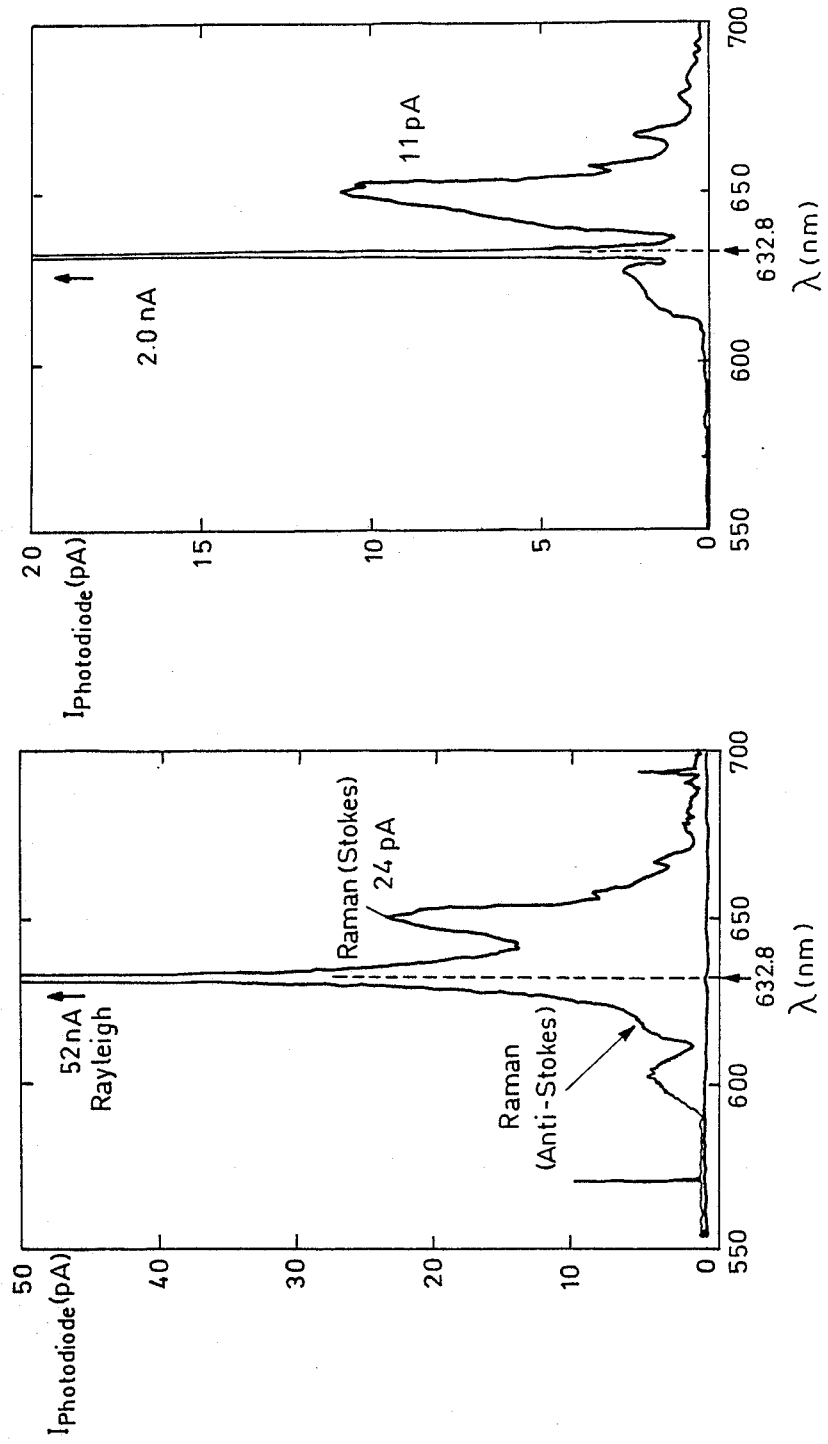

ARRANGEMENT FOR TIME-RESOLVED OPTICAL BACKSCATTER MEASUREMENT AT OPTICAL WAVEGUIDES

BACKGROUND OF THE INVENTION

This invention relates to the measurement of physical quantities by means of the backscattering of light. It specifically relates to an apparatus for time-resolved optical backscatter measurement (OTDR=Optical Time Domain Reflectometry) at optical waveguides, in particular for space-resolved temperature measurement, comprising a light source, which emits light of a specified wavelength, an optical waveguide, first means for coupling the light from the light source into the optical waveguide, second means for coupling the backscattered light, which includes components originating from a Rayleigh scattering and a Raman scattering, out of the optical waveguide, and third means for measuring the backscattered Raman component coupled out of the optical waveguide.

Discussion of the Background

Time-resolved optical backscattering measurements at optical waveguides, known under the abbreviation OTDR (Optical Time Domain Reflectometry), have already served, for a relatively long period of time, for the space-resolved measurement of attenuation in the optical waveguides (see, for example, the article by S. D. Personick, "Photon Probe - An Optical-Fiber Time-Domain Reflectometer", Bell Syst. Tech. J. 56, 1977, pp. 355 et seq).

In this known process of backscatter measurement, the light which is backscattered by Rayleigh scattering is recorded in the form of an echo pulse and evaluated, in order to obtain information on the attenuation of propagation in the optical waveguide as a function of the distance.

It has now also been known for a brief period of time (see, for example, GB-A No. 2,140,554 or the article by J. P. Dakin et al. in SPIE Vol. 566 Fiber Optic and Laser Sensors III (1985), pp. 249 et seq) to carry out such backscatter measurements at optical waveguides in such a manner that a space-dependent temperature measurement may be performed on this basis.

In this connection, it is necessary to filter out the relatively strongly temperature-dependent component of the Raman scattering, which appears only weakly beside an intense peak of the Rayleigh scattering (e.g. with a monochromator) and to evaluate the same. Details of the process can be obtained from the above-cited publications.

In weakly doped quartz glass, of which optical waveguides (briefly referred to as OWG) in general consist, the component of the Raman scattering (scattering at molecular oscillations) is less than 1/1000 as compared with the principal component of the Rayleigh scattering (scattering at density fluctuations). The Raman scattering comprises a Stokes peak present at relatively large wavelengths and an anti-Stokes peak existing at relatively small wavelengths.

The Stokes peak does in fact account for only 1/2000 of the value of the corresponding Rayleigh peak, but is relatively well marked. On the other hand, in the backscatter spectrum, as a result of the limited resolution of the monochromator, the anti-Stokes peak is only recognizable as a weak shoulder on the flank of the Rayleigh peak. In the case of space-resolved temperature measurement, it is, however, precisely the anti-Stokes Raman scattering component which is absolutely and accurately required, since the marked temperature dependence of this forms the basis of the measurement process. Thus, any possibility of rendering the interfering Rayleigh peak harmless serves to improve the signal analysis.

SUMMARY

Accordingly, the object of this invention is to provide a novel measuring apparatus for optical backscatter measurement, in which a significantly improved signal-to-noise ratio is achieved.

In an apparatus of the initially mentioned type, the object of the invention is achieved in that there is disposed between the second and third means a filter device, which selectively attenuates the backscattered light component originating from the Raleigh scattering.

A key feature of the invention thus consists in firstly selectively attenuating the very high Rayleigh peak in the backscatter spectrum prior to evaluation, in order then to be able to carry out improved separation of the relatively weak anti-Stokes peak by means of a filter or a monochromator.

According to a preferred exemplary embodiment, the filter device for the attenuation of the Rayleigh peak comprises a polarizing beam splitter, through which the backscattered light is passed, and behind which a quarter-wave plate and an interference filter are disposed in succession in the transmission direction, both of which are tuned to the wavelength of the light emitted by the light source. At the output of the filter device, that radiation is then taken off which is reflected by the interference filter and is reflected out to the side by the polarizing beam splitter.

The construction becomes particularly simple if the coupling-in and coupling-out of the light into the OWG is performed by means of a common polarizing beam splitter, which is disposed between the light source and the OWG in the transmission direction, and if a first optical focusing system is provided between the common polarizing beam splitter and the OWG.

In this case, the common polarizing beam splitter provided for light coupling-in and for light coupling-out and the polarizing beam splitter of the filter device can then be combined into a common third polarizing beam splitter. At the third polarizing beam splitter there is then disposed, on the side of the emerging backscattered light, a deflecting prism which deflects the backscattered light emerging from the beam splitter back into the beam splitter. Finally, the quarter-wave plate and the interference filter of the filter device are disposed on the side of the third polarizing beam splitter opposite the deflecting prism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic block diagram of an apparatus known per se for OTDR measurement;

FIG. 2 is a schematic block diagram of the construction, amended according to the invention, of the apparatus according to FIG. 1 with the additional filter device (in part);

FIG. 3 is a schematic block diagram of an exemplary embodiment of the internal construction of a filter device according to FIG. 2;

FIG. 4A is a graph showing the transmission behavior of an interference filter from the filter device according to FIG. 3;

FIG. 4B is a graph showing the transmission behavior of the entire filter device according to FIG. 3;

FIG. 5 is a schematic block diagram of the preferred exemplary embodiment of an OTDR apparatus according to the invention with only one polarizing beam splitter fulfilling a plurality of functions;

FIG. 6A shows the backscatter spectrum of an OTDR apparatus without the filter device according to the invention; and FIG. 6B shows the corresponding backscatter spectrum with the use of the filter device according to the invention.

DESCRIPTION OF THE PREFERRED EMBODIMENTS

Referring now to the drawings, wherein like reference numerals designate identical or corresponding parts throughout the several views.

FIG. 1 reproduces a simple construction, known per se, for measurement of the continuous backscattering in an OWG. Light from a light source 1 is employed for the measurement, which light source can be, for example, an He-Ne laser (with a power of 12 mW) or a semiconductor laser diode.

The light from the light source 1 is passed through a polarizing beam splitter 2, which serves to suppress the interfering Fresnel reflection (to less than 10% of the Rayleigh peak) on the coupling-in side of the OWG.

After passing through the polarizing beam splitter 2, the light is coupled via a first optical focusing system 3 into an optical waveguide 5, which serves as a spatially distributed temperature sensor and is provided, at its other end, with an index matching arrangement 6. This index matching arrangement 6, for example a container containing oil of an appropriate refractive index, serves to suppress the Fresnel reflection at this end of the OWG.

The light reflected over the entire length of the OWG passes via the first optical focusing system 3 back to the polarizing beam splitter 2, is there reflected out laterally, and falls via a second optical focusing system 4, spectrally scanned and split up by a monochromator 7, onto a photodetector 8, for example a PIN photodiode, an avalanche photodiode or a photomultiplier.

For the Raman frequencies isolated in the monochromator 7, the backscattered pulse generated by the light source 1 operating in a pulsed mode is recorded and evaluated in an evaluating unit 9.

A backscatter spectrum, in the form in which it can be scanned by the monochromator 7 in a measuring apparatus according to FIG. 1, is shown in FIG. 6A in the wavelength range from 550 nm to 700 nm. The current of a photodiode employed as photodetector 8 is plotted therein in picoampere units as a measure of the intensity of the backscattered radiation.

It is immediately evident in FIG. 6A that the Rayleigh peak in the backscatter spectrum with a photodiode current of 52 nA, which peak is not suitable for the temperature measurement and is therefore an interfering peak, exceeds in its intensity, by several orders of magnitude, all other peaks, i.e. the Raman-Stokes and Raman-anti-Stokes peaks required for the temperature measurement.

The actual anti-Stokes peak, which is particularly temperature-sensitive, appears in the towering Rayleigh peak only as a weakly recognizable shoulder. For an accurate and reproducible temperature measurement using the OWG, it is therefore important to emphasize and to set off the Raman peaks as against the Rayleigh peak prior to evaluation as far as possible by means of measurement technology.

Now, this takes place according to the invention according to FIG. 2 by means of an additional filter device 10, which is inserted, in an arrangement according to FIG. 1, between the polarizing beam splitter and the second optical focusing system 4 and is designed in such a manner that essentially only the Rayleigh peak in the backscatter spectrum is attenuated.

According to a preferred exemplary embodiment of the invention, the filter device 10 has an internal construction of the form represented in FIG. 3. Components of the filter device 10 are a polarizing beam splitter 11, a quarter-wave plate ($\lambda/4$ plate) 12 and an interference filter 13, both of which are disposed behind the polarizing beam splitter 11 in the transmission direction.

The function of the filter device 10 appearing in FIG. 3 can be explained with reference to the measurement curves shown in FIG. 4A and B: collimated light from a halogen lamp, that is to say a continuous spectrum, which is incident from above via a first deflecting mirror. S1, is split up, by means of the polarizing beam splitter 11, into two mutually perpendicularly polarized components (beam B1 and beam B3). After passing through the quarterwave plate 12, beam B1 is reflected at the (narrow-band) interference filter 13 and at the same time transmitted (e.g. to the extent of 85%).

If the incident light has a continuous spectral distribution (curve a in FIG. 4A) in the transmission range of the interference filter 13, and if the quarter-wave plate 12 is tuned to the interference filter 13, this results, for example, in a transmission curve of the beam B1 of the form represented in FIG. 4A as curve b. In the selected example, the arrangement is tuned to a wavelength of approximately 633 nm and has a half-width of approximately 11 nm.

At this time, the light reflected at the interference filter 13 has an intensity distribution (FIG. 4B) which is approximately the inverse of that shown in curve b shown in FIG. 4A. The reflected beam B2 passes out laterally at the polarizing beam splitter 11, because the linearly polarized light is rotated in its direction of polarization through 90° after a double passage through the quarter-wave plate. In the event that the incident light itself is already correspondingly linearly polarized, the beam B3 is even omitted (shown in broken lines in FIG. 3).

The reflected beam B2 can now be coupled out of the filter device 10 by means of appropriate deflecting mirrors S2, S3. Moreover, the deflecting mirrors S1 . . . S3 serve merely to design the filter device 10 in such a manner that it can be inserted directly into a beam path. On the other hand, the cooperation of the beam splitter 11, the quarterwave plate 10 and the interference filter 13 is essential to the filter operation.

As can be clearly read off from the curve in FIG. 4B, the filter device 10 according to FIG. 3 has the properties of a "band-reject" filter, which, apart from a narrow-band range, transmits all wavelengths to a large extent without attenuation. If the central wavelength of this narrow-band attenuation range (approximately 633 nm in FIG. 4B) is now tuned to the central wavelength of the Rayleigh peak, i.e. to the wavelength of the monochromatic light source 1, then the Rayleigh peak can be decisively attenuated in relation to the Raman peaks, and the measurement process can in this way be improved. If an He-Ne laser is, for example, employed as light source 1, then such tuning takes place to a wavelength of 632.8 nm.

In place of the backscatter spectrum evident from FIG. 6A, the use of the filter device 10 results in a backscatter spectrum according to FIG. 6B, in which the left-hand Raman-anti-Stokes peak is clearly set off from the Rayleigh peak as a result of the attenuation of the Rayleigh peak.

It is evident that, with such a filter device with an interference filter 13 which is not yet even specifically optimized, it is possible to reduce a Rayleigh peak with a half-width of approximately 10 nm to 15%. A further improvement may be achieved if an interference filter 13 having a transmissivity exceeding 95% is employed.

An OTDR measuring apparatus with an additional filter device may be constructed in a particularly simple manner if only a single beam splitter is employed for the polarizing beam splitter 2 for the coupling-in and coupling-out shown in FIGS. 1, 2 and the polarizing beam splitter 11 of the filter device shown in FIG. 3, i.e. if the means for coupling in and coupling out the light into the OWG are combined into one unit with the filter device.

Such a preferred construction is reproduced in FIG. 5. In this case, the beam splitters 2 and 11 are combined into a third beam splitter 15. The backscattered light reflected out laterally from the beam splitter 15 is deflected back via a deflecting prism 14 into the beam splitter 15 and passes through the series circuit, disposed on the opposite side, of the quarter-wave plate 12 and the interference filter 13. The light reflected at the interference filter 13 passes back into the beam splitter, is there reflected out towards the entrance side, and passes again into the monochromator via a deflecting mirror S4 and the second optical focusing system 4. In this instance, the OWG arrangement and the evaluating unit are the same as in FIG. 1.

Thus, as a whole, with the invention an arrangement for space-resolved temperature measurement by means of OTDR is available, which exhibits a significantly improved signal-to-noise ratio.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for time-resolved optical backscatter measurement (OTDR=Optical Time Domain Reflectometry) at optical waveguides, in particular for space-resolved temperature measurement, comprising:
   a light source, which emits light of a specified wavelength;
   an optical waveguide;
   first means for coupling the light from the light source into the optical waveguide;
   second means for coupling backscattered light, which includes components originating from a Rayleigh scattering and a Raman scattering, out of the optical waveguide;
   third means for measuring the backscattered Raman component coupled out of the optical waveguide; and
   a filter device disposed between the second and third means, said filter device selectively attenuating the backscattered light component originating from the Rayleigh scattering;
   wherein the filter device comprises a polarizing beam splitter, behind which a quarter-wave plate and an interference filter are disposed in succession in the transmission direction, both of which are tuned to the wavelength of the light emitted by the light source, and wherein at an output of the filter device radiation which is reflected by the interference filter and is reflected out to the side by the polarizing beam splitter is taken off;
   wherein the first and second means comprise a common polarizing beam splitter, which is disposed between the light source and the optical waveguide in the transmission direction, and a first optical focusing system disposed between the common polarizing beam splitter and the optical waveguide;
   the common polarizing beam splitter of the first and second means and the polarizing beam splitter of the filter device combined into a single polarizing beam splitter;
   a deflecting prism disposed at said single polarizing beam splitter, on the side of the emerging backscattered light, said deflecting prism deflecting the backscattered light emerging from said single beam splitter back into the beam splitter; and
   the quarter-wave plate and the interference filter of the filter device disposed on the side of said single polarizing beam splitter opposite the deflecting prism.

2. The apparatus as claimed in claim 1, wherein the interference filter exhibits a transmissivity of at least 85%.

3. The apparatus as claimed in claim 1, wherein the half-width of the transmission curve of the interference filter is in the region of 10 nm.

4. The apparatus as claimed in claim 1, wherein the light source comprises an He-Ne laser.

5. The apparatus as claimed in claim 1, wherein the third means comprises:
   a series circuit including,
   an optical focusing system,
   a monochromator,
   a photodetector, and
   an evaluating unit.

6. The arrangement as claimed in claim 1, wherein the light source comprises a semiconductor laser diode.

7. The apparatus as claimed in claim 2, wherein the interference filter exhibits a transmissivity of greater than 95%.

* * * * *

UNITED STATES PATENT AND TRADEMARK OFFICE
CERTIFICATE OF CORRECTION

PATENT NO. : 4,804,264
DATED : February 14, 1989
INVENTOR(S) : KIRCHHOFER ET AL.

It is certified that error appears in the above-identified patent and that said Letters Patent is hereby corrected as shown below:

IN THE DRAWINGS

Sheet 1, Figure 3, Change the label of the box "12" from "2/4 PLATE" to -- $\lambda/4$ PLATE--.

Sheet 2, Figure 5, change the label of the box "12" from "2/4 PLATE" to -- $\lambda/4$ PLATE--.

Signed and Sealed this

Seventh Day of November, 1989

*Attest:*

JEFFREY M. SAMUELS

*Attesting Officer*     *Acting Commissioner of Patents and Trademarks*